(12) United States Patent
Pfefferseder et al.

(10) Patent No.: US 7,286,704 B2
(45) Date of Patent: Oct. 23, 2007

(54) IMAGING FIRE DETECTOR

(75) Inventors: Anton Pfefferseder, Sauerlach-Arget (DE); Ulrich Oppelt, Zorneding (DE)

(73) Assignee: Robert Bosch GmbH, Stuttgart (DE)

( * ) Notice: Subject to any disclaimer, the term of this patent is extended or adjusted under 35 U.S.C. 154(b) by 526 days.

(21) Appl. No.: 10/221,081

(22) PCT Filed: Feb. 15, 2001

(86) PCT No.: PCT/DE01/00564

§ 371 (c)(1),
(2), (4) Date: Sep. 6, 2002

(87) PCT Pub. No.: WO01/67415

PCT Pub. Date: Sep. 13, 2001

(65) Prior Publication Data

US 2003/0038877 A1 Feb. 27, 2003

(30) Foreign Application Priority Data

Mar. 9, 2000 (DE) .............................. 100 11 411

(51) Int. Cl.
*G06K 9/00* (2006.01)
*G08B 17/12* (2006.01)
*G01J 5/02* (2006.01)
(52) U.S. Cl. .................. 382/181; 340/577; 250/339.15
(58) Field of Classification Search .................... None
See application file for complete search history.

(56) References Cited

U.S. PATENT DOCUMENTS

| | | | | |
|---|---|---|---|---|
| 4,614,968 A | * | 9/1986 | Rattman et al. | 348/143 |
| 4,775,853 A | * | 10/1988 | Perez Borruat | 340/521 |
| 4,909,329 A | * | 3/1990 | Yoshida et al. | 169/61 |
| 5,005,003 A | * | 4/1991 | Ryser et al. | 340/587 |
| 5,153,722 A | * | 10/1992 | Goedeke et al. | 348/159 |
| 5,289,275 A | * | 2/1994 | Ishii et al. | 348/154 |
| 5,510,772 A | * | 4/1996 | Lasenby | 340/578 |
| 5,592,151 A | * | 1/1997 | Rolih | 340/584 |
| 5,726,632 A | * | 3/1998 | Barnes et al. | 340/577 |
| 5,734,335 A | * | 3/1998 | Brogi et al. | 340/870.05 |
| 5,959,589 A | * | 9/1999 | Sadovnik et al. | 343/765 |
| 6,064,064 A | * | 5/2000 | Castleman | 250/339.15 |
| 6,153,881 A | * | 11/2000 | Castleman | 250/339.15 |
| 6,184,792 B1 | * | 2/2001 | Privalov et al. | 340/578 |

(Continued)

FOREIGN PATENT DOCUMENTS

DE 39 24 250 2/1991

(Continued)

*Primary Examiner*—Bhavesh M Mehta
*Assistant Examiner*—Charles Kim
(74) *Attorney, Agent, or Firm*—Kenyon & Kenyon LLP

(57) ABSTRACT

An imaging fire detector is used to detect a fire from a recorded image sequence. Either a video camera or an infrared camera is used as an imaging device. Characterizing parameters of a fire are either analyzed individually or in combination. In order to detect changes, an object analysis, a pattern analysis or a spatial-frequency analysis of the recorded image sequences is conducted. Using a threshold value for the duration of the changes, short-term changes are detected and discarded. In a further embodiment, the fire detector may also be used as a burglar alarm. With the aid of communication means, the fire detector transmits a fire alert to a master station.

19 Claims, 1 Drawing Sheet

U.S. PATENT DOCUMENTS

| | | | |
|---|---|---|---|
| 6,549,130 B1 * | 4/2003 | Joao | 340/539.14 |
| 6,556,981 B2 * | 4/2003 | Pedersen et al. | 706/44 |
| 6,844,818 B2 * | 1/2005 | Grech-Cini | 340/628 |
| 6,937,743 B2 * | 8/2005 | Rizzotti et al. | 382/100 |
| 7,002,478 B2 * | 2/2006 | Moore et al. | 340/577 |
| 2002/0026431 A1 * | 2/2002 | Pedersen et al. | 706/1 |

FOREIGN PATENT DOCUMENTS

| | | |
|---|---|---|
| EP | 0 654 770 | 9/1994 |
| EP | 0 687 594 | 9/1994 |
| EP | 0 660 282 | 12/1994 |
| EP | 1 131 802 | 10/1999 |
| EP | 0 984 413 | 3/2000 |
| GB | 2 269 665 | 2/1994 |
| GB | 23 123 52 | 10/1997 |
| JP | 082 029 67 | 8/1996 |
| JP | 091 494 75 | 6/1997 |
| JP | 2000-268270 | * 9/2000 |
| JP | 2000-331262 | * 11/2000 |

* cited by examiner

IMAGING FIRE DETECTOR

FIELD OF THE INVENTION

The present invention relates to an image-producing fire detector.

BACKGROUND INFORMATION

Japanese Published Patent Application No. 082 029 67 describes use of a fire detector having a video camera as an imaging device. The video camera is placed in a tunnel, and the recording signals of the video camera are converted into a digital signal via an analog-digital converter. The digital signals are stored, and a processor implements a brightness histogram. A determination as to whether a fire exists or not is made by comparing the pixel number to a particular brightness value.

U.S. Pat. No. 5,289,275 describes a comparison of edge images with a reference image. In this context, individual images are compared to the reference image. Furthermore, it is described that radiant energy is derived from one image to recognize a fire. The fire is detected by an image in this case. In doing so, the extent of the flames is analyzed in order to subsequently estimate the radiant energy in conjunction with a temperature measurement, which leads to a decision as to whether a fire exists or not. In the process, transitions in the radiant energy are also taken into account from sample to sample.

SUMMARY

The imaging fire detector according to the present invention has the advantage that the recorded scene is used over a period of time to determine whether a fire exists or not, by evaluating a sequence of images. Thus, instantaneous recordings such as passing motor vehicles do not influence the prognosis of whether a fire is present or not. Furthermore, detecting the time dependence of a fire facilitates prediction of the further course of the fire, which is very useful for fighting the fire because it will then be possible for firefighting units to provide appropriate means to fight the given fire efficiently.

The fire detector according to an embodiment of the present invention allows a plurality of fire parameters to be measured in combination, so that it can be reliably ascertained whether a fire exists or not. Such fire parameters include fire smoke, combustion heat, heat radiation, gas detection and the appearance of light from the flames. A determination of a fire may be made from these characterizing parameters.

The fire detector according to an embodiment of the present invention may be used both inside and outside, due to the large field of view of the camera and the fact that fire detector not being dependent on other sensors, which significantly increases the application opportunities for the fire detector. In this manner, not only internal areas of buildings, tunnels and storage facilities, but also wooded areas and external facilities may be monitored.

The fire detector according to an embodiment of the present invention may also be advantageously combined with a fire-fighting system, so that automatic fire-fighting is carried out, based on an analysis of the developing fire.

It is particularly advantageous for either an image sequence or only one image of the recorded fire to be transmitted together with the fire alert, so that the unit receiving the alarm may determine how the fire is developing and how the fire may be fought most efficiently. This significantly increases the operativeness of the fire detector, since a decision is made not only as to whether a fire exists or not, but it is also possible to predict the development of the fire and how the fire may be fought most effectively.

The components of the fire detector, the imaging device, the processor, the memory device and the communications means, may be accommodated in a housing. As a result, the mounting and installation of the fire detector may be accomplished inexpensively.

Furthermore, the imaging device can be detached from the other components of the fire detector, which gives more flexibility with regard to the application possibilities of the fire detector. This arrangement provides a simpler installation of not the camera in addition to the other components, based on an effective placement of the individual components.

It is also advantageous to use a video camera as an imaging device, which delivers a realistic depiction of the monitored scene. This also allows an object analysis in which individually depicted objects can be automatically analyzed to ascertain whether these objects are hidden by smoke, heat streaks or fire. This may be done by a comparison with stored objects. Thus, it is possible to clearly identify a fire and the progress of the fire, resulting in effective fire fighting.

Furthermore, an infrared camera, such as a heat imaging camera or a thermopile array, can be used as an imaging device to monitor fires. In this manner, an analysis is focused on heat pockets and heat manifestations. This allows an uncomplicated fire analysis, since it is basically the heat development that is monitored.

Ray coupling may be optimized by using an optical system as the imaging device, so that the fire may thus be detected on the basis of weak signals, especially in the early stages of a fire. This is particularly advantageous for early fire detection, since the fire-fighting may then be initiated in a timely fashion.

It is also advantageous to use a light source together with the imaging device in order to identify characterizing parameters such as opacity and scattering due to smoke particles. For this purpose, a specific degree of illumination, and thus a light source, are applied. Therefore, such further characterizing parameters of a fire can also be identified in this manner.

The fire detector according to an embodiment of the present invention identifies heat streaks and smoke clouds as characterizing parameters of a fire by comparing stored data with recorded data. This allows a fire to be unambiguously detected based on fire parameters that are not directly related to the appearance of the fire itself. A fire may thus be identified, even if the fire occurs in a location that is unfavorable for the imaging device.

The effect of characterizing parameters of a fire on the recorded image sequence is advantageously determined by changes in the pattern resolution in the image sequence. This constitutes a simple and clear fire identification, which is also combined with other features to identify a fire.

In addition, the fire detector according to an embodiment of the present invention undertakes a flame classification, which is then transmitted by the fire alert and communication means of the fire detector to provide the fire-fighting units with optimal in information, so that the fire-fighting units are able to prepare for the fire before reaching the location of the fire. In this case, the communication means may also include a connected siren, an alarm light or an alarm relay.

Changes in the image sequence may be detected by comparisons with reference images, short-term changes being filtered out by comparing the appearance of short-term changes to a temporal threshold value. In this manner, short-term phenomena, such as the appearance of an insect in the field of vision of the imaging device or the passing of a motor vehicle, can be advantageously eliminated from the fire-detection analysis. This considerably reduces false fire alarms.

According to a further embodiment of the present invention, the processor clearly identifies changes, using spatial frequencies that it acquires from the ascertained image sequences. This advantage is increased by the use of a bar code, which is placed opposite the imaging device of the fire detector, because this bar code provides an easily identifiable pattern for generating spatial frequencies and information items evaluated in the fire detector on the basis of the image analysis can be encoded in the bar code. An application code is an example of such an information item.

Additionally, the fire detector according to an embodiment of the present invention is also used as a burglar alarm in that persons appearing are identified through object analysis in order to transmit a burglar alarm, if warranted. This is particularly advantageous in situations for a fire detector when there is a danger of vandalism, which may be the cause of a fire.

Furthermore, a fire alert may be generated by using a combination of characteristic parameters for a fire in combination and/or the results of a plurality of analysis methods for fire detection. In this manner, the number of false fire alarms can be considerably reduced in an advantageous manner.

DETAILED DESCRIPTION

Fires are detected on the basis of characterizing parameters of a fire. Fire smoke, combustion heat, heat radiation, gas detection and the appearance of light from the flames are such parameters. With respect to smoke, it is the particle diameter, the color of the smoke, the smoke density and the opacity of objects that is analyzed. The heat generation that normally accompanies a fire leads to heat streaks, which cause a change in the refractive index of the air, and are therefore optically identifiable. Since a fire is primarily a temporal phenomenon, it is useful to ascertain the development of a fire over time, so that a differentiable measurement, i.e., the comparison of consecutive times of a measurement, can be made, allowing a fire to be monitored.

Therefore, the fire detector according to an embodiment of the present invention uses an imaging device to generate an image sequence, which is analyzed by a processor of the fire detector in order to output a fire alert, if warranted, and to transmit this fire alert via communication means. In particular, the time characteristic of a developing fire is analyzed. According to a further embodiment, the fire alert is provided with an image or image sequences, in order to prepare for efficient fighting of the fire. By using a video or infrared camera, different features are advantageously analyzed in each case. The turbidity and/or dispersion caused by smoke is/are detected in the image sequence by using additional light source. By analyzing the pattern resolutions of spatial frequencies and by comparing the image sequences with reference images, the processor detects changes in the image sequences, the processor identifying and discarding short-term changes, using a threshold value for the duration of the changes.

Figure 1:
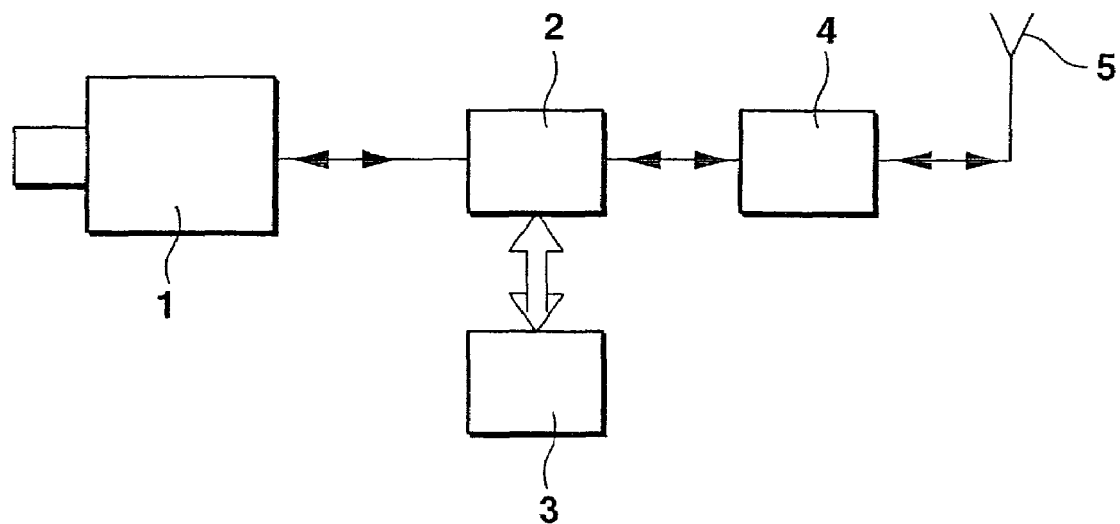
FIG. 1 depicts an embodiment of a fire detector according to the present invention.

In FIG. 1, the fire detector according to an embodiment of the present invention is represented as a block diagram. A camera 1, as the imaging device, is connected via a data input/output with a first data input/output of a processor 2. Processor 2 is connected to a memory device 3 via its second data input/output. Transmitting/receiving station 4 is connected to a third data input/output of processor 2. An antenna 5 is connected to a second data input/output of transmitting/receiving station 4.

Camera 1, as the imaging device, observes the area to be monitored for fire. In this case, camera 1 is stationary with respect to an area to be monitored or it may alternatively be moveable by an electric motor, so that camera 1 can be moved in different directions. In this case, the electric motor can be part of camera 1 and controlled by processor 2, for example, by input signals received by antenna 5 and transmitting/receiving station 4 and transmitted to processor 2.

A video camera may be used as camera 1 in this case. The video-camera signals are digitized by an electronics system connected to camera 1, and then transmitted to processor 2. However, the video camera itself may already be provided with a digital output of its own, for instance according to the IEEE 1394 standard. A digital camera is a further alternative, which is to be used to record single images, and which, in this case, may have a computer interface to be connected to processor 2. The image sequence may be sufficiently large for the image changes to detect fires. An image-sequence frequency of approximately one image per second may be suitably large for many applications.

The video camera may also be a camera that is sensitive in the near infrared range, i.e., in light wavelengths of less than one micrometer. This has the advantage that an infrared-light source may be used as a light source which is not detected by the human eye and, therefore, is not disturbing.

An infrared camera may alternatively be used, such as a heat-imaging camera or a thermopile array. A heat imaging camera detects the heat emitted by all bodies. A heat-profile image of a scene is obtained, regardless of the light. The wavelength at maximum emission is a function of the temperature in this context. At normal ambient temperature, a body reaches its emission maximum at approximately 10 µm, a hot body of approximately 700° C. reaches its emission maximum at approximately 3 µm. The detection range of a heat-imaging camera is very sensitive in this radiation spectrum.

A simple method for measuring temperature radiation is the use of a thermopile, possibly including an optical system. However, this camera provides measurements for the heat radiation of a surface element. Therefore, a plurality of thermopiles is arranged in one row or in one matrix (array), which permits the use of an imaging device having a low resolution. The recorded images are then analyzed using algorithms for the image analysis.

Using these different camera types, the various characterizing parameters of a fire are detectable to varying degrees of precision. While the video camera is particularly suitable for detecting fire smoke and for flame classification, an infrared camera is primarily suitable for detecting appearances of heat caused by the fire.

By additionally positioning a light source in an appropriate wavelength range for camera 1 as the imaging device, the identification of smoke is facilitated since the particle size of smoke particles is detected through light dispersion at these smoke particles, a corona forming around the defined light source. Opacity may also be determined by analyzing the brightness of the defined light source in the image area. The light source is suitable for a video camera or an infrared camera in the near infrared range at light wavelengths below 900 nm, and emits light at corresponding wavelengths. Especially in the case of such infrared cameras, it may be sufficient to illuminate the wall opposite the infrared camera.

The photosensitivity of a video camera may be increased by the accumulation of a plurality of images, an emerging accumulated image then being compared to a reference image, so as not to lose any information in the image averaged by the accumulation as a result of the low-pass filter response that occurs in this connection. In this manner, it is often possible to dispense with separate lighting.

On the one hand, the number of images depends on camera 1 itself, and, on the other hand, the repetition frequency of the images may be controlled by processor 2.

Processor 2 receives the image sequences from camera 1 as digital data. Processor 2 stores these data in memory device 3 for subsequent analysis of the image sequences. A rewritable memory device, in this case a hard disk, is used as memory device 3. Processor 2 analyzes the image sequence for occurring objects, so that smoke clouds and/or heat streaks may be identified as new objects, if appropriate, or that the opacity of known objects in the monitored scene may be determined. The known objects of the scene are also stored in memory device 3 and called up by processor 2 for comparison purposes.

If processor 2 detects flames as new objects, it will classify the flames by means of stored reference objects for flames. This classification will then invoke a fire alert, which is which is loaded from memory device 3 for a detected fire, in order to then transmit the fire alert via transmitting receiving station 4 and antenna 5. An evaluation of the fire progression is possible on the basis of a time characteristic of the flame classification, and appropriate means and measures may be taken to fight the fire.

Apart from a transmitting/receiving station and a modem, a siren, a warning light and an alarm relay can also be used as communication means. These are connected to the fire detector either via cables or by wireless transmission.

Apart from an object analysis, processor 2 may also detect a change, and thus a developing fire, based on a change over time in the pattern resolution in the image sequence. The changing pattern resolution of objects in a monitored scene is due to the appearance of heat streaks, for instance, or light smoke, which leads to opacity.

Short-term changes in the image sequences are identified with the aid of a threshold value, for the duration of the appearance of this change. If the change disappears after a period of time that is shorter than the threshold value, the short-term change is discarded as irrelevant. In this context, pattern information contained in the camera image is evaluated, with brightness variations and different illumination of the scene not necessarily being considered in the detection result. The pattern information is detected by determining a gradient of the brightness values and/or color values in horizontal direction and vertical direction of the camera images, and thus ascertaining so-called edge information, or information regarding the gray-scale or color-value jumps in the monitored area. In this context, known correlation techniques are used to determine whether a change has occurred or not, by comparing a correlation coefficient with a threshold value. If agreement is established, the correlation coefficient is above the threshold value; if agreement is absent, the correlation coefficient is below the threshold value.

Furthermore, image noise may be eliminated by conventional tests for statistical significance, the statistical-significance test yielding a numerical value, which is used in the comparison to a threshold value to ascertain whether noise is present or not. Thus, global changes for longer periods of time are to be detected, while short-term changes can be eliminated.

Disturbances such as image noise are particularly important when using the fire detector of the present invention in open environments, since the disturbances are more prevalent there and are treated such that they do not result in false fire alerts.

In a further embodiment of the present invention, processor 2 resolves the images of the image sequences into spatial frequencies. On the basis of the spatial frequency changes, processor 2 detects a change in the image sequence, threshold values also being used here to identify changes that are caused by noise or an actual fire or by short-term changes. In this context, the spectrum of the spatial frequencies is a measure of the detail precision of the monitored scene, an opacity caused by smoke leading to a decrease in the detail precision and thus to a change in the spectrum of the spatial frequencies. In this case, the spatial frequencies may be generated by processor 2 by Fourier transformation of the image content or its parts. If no patterns leading to high-frequency spatial frequencies are present in the monitored scene, such patterns may be generated by artificial patterns across from camera 1. Such patterns are similar to bar codes, i.e., vertical line patterns, since it is also possible to encode information in the bar coding.

Changes caused by a fire may then be detected on the basis of the variation over time of the spatial frequencies, opacity, as mentioned below, that lead to a change in the spatial frequencies.

If processor 2 has detected a fire, processor 2 transmits a fire alert via transmitting/receiving station 4 and antenna 5, processor 2 also transmitting images or image sequences of the fire and a flame classification. Transmitting/receiving station 4 and antenna 5 constitute a mobile telephone, which is used to transmit the fire alarm. As an alternative, some other radio transmission may also be used, or also a line-conducted data transmission, a modem being used instead of transmitting/receiving station 4 and antenna 5 to connect the fire detector to a communication network. A siren, an alarm light or an alarm relay represent alternative communication means.

Figure 2:
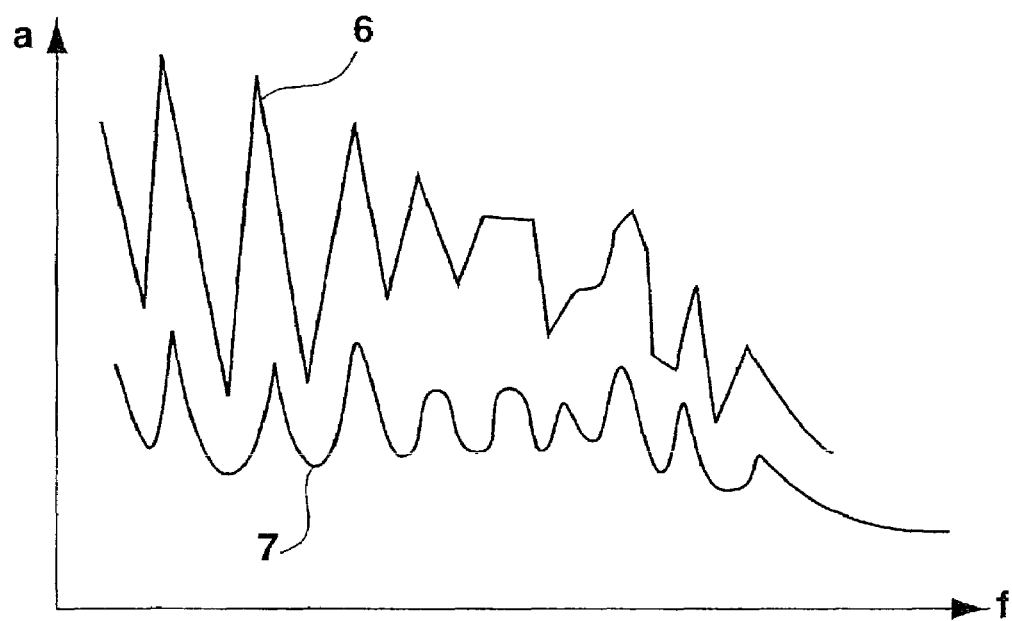
FIG. 2 depicts example spatial frequencies that are detected from images, in one case without turbidity, and in the other case with opacity.

FIG. 2 shows an embodiment according to the present invention of the analysis using spatial frequencies, depicting a fire in one case, and no fire in the other case. The spatial frequencies are plotted on the abscissa, while the intensity of the spatial frequencies is marked off on the ordinate. Spectrum 6 denotes a spatial frequency spectrum of a scene without a fire. Spatial frequency spectrum 7 denotes the spatial frequency spectrum of the same scene with a fire present. Due to opacity, the amounts of the individual spatial frequencies are reduced, which allows an identification of a fire since, in this case, the spatial frequency spectrum 6 and 7 are recorded at different points in time. This shows that when spatial frequencies are employed, the development of a fire over time is primarily detected using a sequentially occurring series of images, while the analysis would be much more difficult and more ambiguous using a single image. In this case, the individual amounts of the spatial frequencies would have to be compared using stored amounts, the different manifestations of smoke resulting in different amounts. Especially at the beginning of a fire, the intensities of the spatial frequencies will only be slightly reduced, although this may be easy to detect by an image sequence.

Heat streaks lead to periodic changes in the image, which can be determined in the time characteristic of the spatial frequencies.

By linking features of different characterizing parameters of a fire, on the one hand, and by the results of the different evaluation procedures, on the other hand, a fire alert can be implemented according to a further embodiment of the present invention, if a plurality of either the characterizing parameters of a fire or the results of the evaluation procedures indicate a fire. This advantageously reduces the number of false fire alarms.

In a further embodiment, the fire detector according to the present invention may also be used as a burglar alarm, detected persons being easily identifiable through object analysis and image-sequence analysis on the basis of spatial frequencies. This is then transmitted by processor 2 in the form of a burglar alarm, using transmitting/receiving station 4 and antenna 5. Here, too, the alternatives for the communication arrangement as outlined above may be implemented.

The fire detector according to an embodiment of the present invention is either compactly accommodated in a housing, or, as an alternative, camera 1 may be operated remotely from the other components. In this case, a plurality of cameras may be connected to processor 2.

What is claimed is:

1. An image-producing fire detector, comprising:
   at least one imaging device configured to generate image sequences;
   a communication device;
   a processor configured to analyze the image sequences generated by the at least one imaging device, detect a change in pattern resolution over time from the image sequences, generate a fire alert based on an outcome of detection, and output the fire alert, the process configured to transmit the fire alert via the communication device; and
   a memory device coupled to the processor.

2. The image-producing fire detector of claim 1, wherein the processor transmits one of an image and an image sequence with the fire alert via the communication device.

3. The image-producing fire detector of claim 1 further comprising:
   a housing accommodating the at least one imaging device, the processor, the memory device and the communication device.

4. The image-producing fire detector of claim 3, wherein the at least one imaging device includes a video camera.

5. The image-producing fire detector of claim 3, wherein the at least one imaging device includes an infrared camera.

6. The image-producing fire detector of claim 5, wherein the infrared camera includes one of a heat-imaging camera and a thermopile array.

7. The image-producing fire detector of claim 5, further comprising:
   an optical system for use with the at least one imaging device.

8. The image-producing fire detector of claim 7, further comprising:
   a light source for use with the at least one imaging device.

9. The image-producing fire detector of claim 8, wherein the processor is configured to detect at least one of smoke-related opacity and scattering in the image sequences using the light source.

10. The image-producing fire detector of claim 1, wherein the at least one imaging device is detachably coupled to the processor, the memory device, and the communication device, and is usable while detached therefrom.

11. The image-producing fire detector of claim 1, wherein the processor is configured to detect at least one of heat streaks and smoke clouds in the image sequences using data stored in the memory device.

12. The image-producing fire detector of claim 1, wherein the processor is configured to classify a flame based on the image sequences, and transmits the classification with the fire alert via the communications device.

13. The image-producing fire detector of claim 1, wherein the processor is configured to detect changes in the image sequences by a comparison to a reference image, and identifies short-term changes based on a duration of the change, using a threshold value.

14. The image-producing fire detector of claim 13, wherein the processor is configured to resolve images of the image sequences into spatial frequencies and to detect a change in the image sequence on the basis of a change in the spatial frequencies.

15. The image-producing fire detector of claim 14, wherein bar code patterns having encoded information are applied for a measurement of the spatial frequencies.

16. The image-producing fire detector of claim 1, wherein the fire detector is adapted to detect a presence of burglars and function as a burglar alarm.

17. The image-producing fire detector of claim 1, wherein the processor is configured to output a fire alert via the communication device, as a function of at least one of:
   a voter-basis decision of characterizing parameters of a fire; and results of analyses of the image sequences.

18. The image-producing fire detector of claim 1, wherein the detection of a change in pattern resolution over time includes ascertaining a change in sharpness of structures in the image sequences by ascertaining at least one of a gradient of brightness values and chromaticity in the horizontal and the vertical directions of images in the image sequences.

19. The image-producing fire detector of claim 1, wherein the detection of a change in pattern resolution over time includes ascertaining a change in sharpness of structures in the image sequences by ascertaining a change in a spectrum of spatial frequencies.

* * * * *